(12) United States Patent
Goulay et al.

(10) Patent No.: US 10,753,142 B2
(45) Date of Patent: Aug. 25, 2020

(54) CONTAINMENT ENCLOSURE HAVING TWO DISTINCT CLOSED POSITIONS

(71) Applicant: Getinge La Calhene, Vendome (FR)

(72) Inventors: Pascal Goulay, Crucheray (FR); Pascal Cochard, Dierre (FR)

(73) Assignee: GETINGE LA CALHENE, Vendome (FR)

( * ) Notice: Subject to any disclaimer, the term of this patent is extended or adjusted under 35 U.S.C. 154(b) by 213 days.

(21) Appl. No.: 15/549,716

(22) PCT Filed: Feb. 8, 2016

(86) PCT No.: PCT/EP2016/052624
§ 371 (c)(1),
(2) Date: Aug. 9, 2017

(87) PCT Pub. No.: WO2016/128352
PCT Pub. Date: Apr. 18, 2016

(65) Prior Publication Data
US 2018/0023337 A1    Jan. 25, 2018

(30) Foreign Application Priority Data

Feb. 9, 2015   (FR) ...................................... 15 51004

(51) Int. Cl.
*B01L 1/04* (2006.01)
*E06B 5/14* (2006.01)
(Continued)

(52) U.S. Cl.
CPC .................. *E06B 5/14* (2013.01); *B01L 1/04* (2013.01); *B25J 21/02* (2013.01); *E06B 7/16* (2013.01);
(Continued)

(58) Field of Classification Search
CPC ..... E06B 3/04; E06B 5/14; E06B 7/16; B01L 1/04; B08B 15/026; B25J 21/02; G21F 7/04; G21F 7/005
(Continued)

(56) References Cited

U.S. PATENT DOCUMENTS 3,260,381 A  *  7/1966  Wagner ..................... B25J 21/02
                                                      414/808
5,257,957 A  *  11/1993 Diccianni ................ B25J 21/02
                                                      312/1
(Continued)

FOREIGN PATENT DOCUMENTS

CN          1928311 A        3/2007
CN          202380909 U      8/2012
(Continued)

OTHER PUBLICATIONS

Search Report issued in French Patent Application No. 1551004 dated Dec. 4, 2015.
(Continued)

*Primary Examiner* — James O Hansen
(74) *Attorney, Agent, or Firm* — Pearne & Gordon LLP

(57) ABSTRACT

The invention relates to a containment enclosure comprising two compartments (21, 22) and a sealing system between the two compartments. The sealing system (16; 23, 30) comprises a door (23) having two opposite faces (23a, 23b). The door comprises a transfer support (30) on one of its faces. According to the invention, the door allows two closed positions distinct from one another, in which positions the door forms a gastight interface between the two compartments.

13 Claims, 4 Drawing Sheets

(51) Int. Cl.
*B25J 21/02* (2006.01)
*G21F 7/04* (2006.01)
*G21F 7/005* (2006.01)
*E06B 7/16* (2006.01)

(52) U.S. Cl.
CPC ............... *G21F 7/005* (2013.01); *G21F 7/04* (2013.01); *B01L 2200/0689* (2013.01)

(58) Field of Classification Search
USPC ........ 312/1, 257.1, 209, 114; 49/42; 454/56, 454/57, 187; 422/565; 600/21, 22; 55/385.2
See application file for complete search history.

(56) References Cited

U.S. PATENT DOCUMENTS

| | | | | |
|---|---|---|---|---|
| 5,486,044 | A * | 1/1996 | Bennett | A47F 3/0486 211/88.01 |
| 6,660,227 | B2 * | 12/2003 | Lopez Ordaz | A61L 2/0011 209/578 |
| 6,974,197 | B1 * | 12/2005 | Henry | B01L 1/50 312/1 |
| 7,596,957 | B2 * | 10/2009 | Fuhr | B25J 21/02 62/78 |
| 2014/0290162 | A1 * | 10/2014 | Tanimoto | F24F 3/161 52/234 |

FOREIGN PATENT DOCUMENTS

| | | |
|---|---|---|
| CN | 102858077 A | 1/2013 |
| EP | 296134 | * 12/1988 |
| GB | 2 182 702 A | 5/1987 |
| GB | 2 224 061 A | 4/1990 |
| WO | 02/074504 A2 | 9/2002 |

OTHER PUBLICATIONS

International Search Report issued in Application No. PCT/EP2016/052624 dated Apr. 19, 2016.
Written Opinion issued in Application No. PCT/EP2016/052624 dated Apr. 19, 2016.
Utility U.S. Appl. No. 15/522,079, "Lighting Solution for a Containment Chamber" filed Apr. 26, 2017.

* cited by examiner

CONTAINMENT ENCLOSURE HAVING TWO DISTINCT CLOSED POSITIONS

TECHNICAL FIELD

The invention relates to insulators usually used in pharmaceutical production or research or in hospital pharmacy. These sealed confined enclosures allow a staff/product cross protection towards chemical and microbiological contaminations without compromising the environment.

STATE OF PRIOR ART

The insulator 10 represented in FIG. 1 includes the following different sub-assemblies: a work station 11, a transfer system or airlock 12, a control system 13, a handling system 14 such as a glove box, a ventilation or filtration system 15.

Removable closing elements connected to the enclosure wall by one of their sides, such as rectangular doors, and associated with devices such as inflatable seals maintain tightness therein between:
the airlock and the outside, on the one hand,
the airlock and the work zone, on the other hand.

The introduction of materials or components via the airlock is made for example in accordance with the following consecutives steps:
loading a carriage with the components to be transferred,
introducing the carriage into the airlock via the aperture of the first door separating the airlock from the outside, the second door separating the airlock and the work zone being closed,
bio-decontaminating the airlock and its contents after closing the first door,
opening the second door and transferring the carriage with its components,
discharging the empty carriage into the airlock, closing the second door,
opening the first door, recovering the carriage and preparing a new loading.

One object of the invention is to offer an insulator with a reduced volume and a simplified use relative to known techniques, while offering a satisfactory sealing interface to separate the airlock from the work zone.

DISCLOSURE OF THE INVENTION

Thus, the invention relates to a containment enclosure including a first compartment, a second compartment and a sealing system between both compartments. The sealing system comprises a door having a first face and a second face opposite to the first face. The door includes a transfer support onto the first face.

According to the invention, the door is configured to have a first closed position and a second closed position, distinct from each other. The first face participates in delimiting the first compartment in the first closed position. The first face participates in delimiting the second compartment in the second closed position.

This door structure has the following advantages.

It facilitates product transfer from one compartment to the other. It offers in particular the possibility to dispense with a carriage to transfer products from one compartment to the other.

It also enables the bulk necessary to open the door and thus the volume of one of the compartments, for example a transfer airlock, to be reduced and thus enabling a quicker decontamination thereof.

The containment enclosure besides includes a satisfactory sealing interface to separate the airlock from the work zone.

In other words, the enclosure includes a sealing interface between two volumes, the interface including a door housed in a frame, for example formed by at least one rim of one of the envelopes delimiting each volume, the door including two faces, at least one of the faces being provided with a support forming means, the interface assuming two distinct closed states wherein the door is sealingly and gas tightly disposed in the frame, and the support forming means is disposed on a respective side of the frame depending on whether the interface is in the first or in the second closed state.

In one of its closed positions, a face of the door points to a first compartment, whereas the other face of the door points to the other of the compartments. It is the opposite in the other closed position.

Advantageously, the transfer support is located in a first of the compartments in a first closed position of the door, and in a second of the compartments in a second closed position.

Advantageously, the door includes a transfer support on each of its faces. This structure enables the conveyance of products to the work station, the recovery of products used from the same and the airlock decontamination to be accelerated.

Advantageously, the door is pivotably mounted about a vertical axis. These characteristics enables the strain to be provided by the user to be limited as much as possible because the weights of the transfer member and the products to be transferred are supported by the door axis, unlike carriages known in prior art.

In a particular configuration, the vertical axis passes through the middle of the lower and upper edges of the door. This configuration has the advantage of offering a constant access distance from one of the compartments, for example from a handling system disposed in one of the volumes.

The vertical axis can thereby directly connect the door to a frame in which the door is housed in either of its closed positions, the frame being for example formed by a rim of the envelope of one of the compartments. This solution is particularly simple and cheap.

The door can also be pivotably mounted on a support reinforcement, the support reinforcement being itself pivotably mounted to a wall of the containment enclosure, for example outside a sealing plane defined by a seal. This reinforcement is for example an arm which, by virtue of this two-pivot system, is moved inside one of the compartments, for example the airlock, upon handling the door. This particular structure allows a higher loading volume and further limits the bulk necessary to open the door in one of the compartments, for example the work station.

In another configuration, the door includes a groove in an upper or lower edge, a shuttle slidably mounted in the groove, the shuttle being pivotably mounted relative to the containment enclosure. This structure offers a further sliding degree on the shuttle and enables the entire surface of the door to be readily accessed when the same is open.

The door preferably includes a groove on the upper edge and a groove on the lower edge.

Advantageously, at least one abutment is provided to block the door in its closed positions.

The abutment is preferentially insulated from each of the compartments by a seal.

The abutment can be fixed or retractable. A fixed abutment is a simple and cheap solution. A removable abutment allows a particularly ready handling of the door, since it can be rotated in any direction from any of its closed positions.

The invention further relates to a method for transferring a loading between two compartments of a containment enclosure as described above, including the step of moving the door from a first closed position to a second closed position. The movement of the door between its two closed positions can be accompanied with the removal of a loading from one or from each of the faces of the door and/or with the deposition of a loading on one or on each of the faces of the door. Advantageously, a step of loading and/or a step of unloading at least one load onto or into said transfer support is provided prior to or subsequently to the step of moving the door, the movement of the door bringing the product from one of both compartments to the other.

BRIEF DESCRIPTION OF THE DRAWINGS

Embodiments of the invention will now be described by way of non limiting example, referring to the appended drawings, in which.

DETAILED DISCLOSURE OF PARTICULAR EMBODIMENTS

The insulator 20 or containment enclosure according to the invention includes two main volumes: a work station 21 (or operating volume or first operating compartment), an airlock 22 (or transfer volume or second transfer compartment) and a sealing system 16.

Figure 2A:
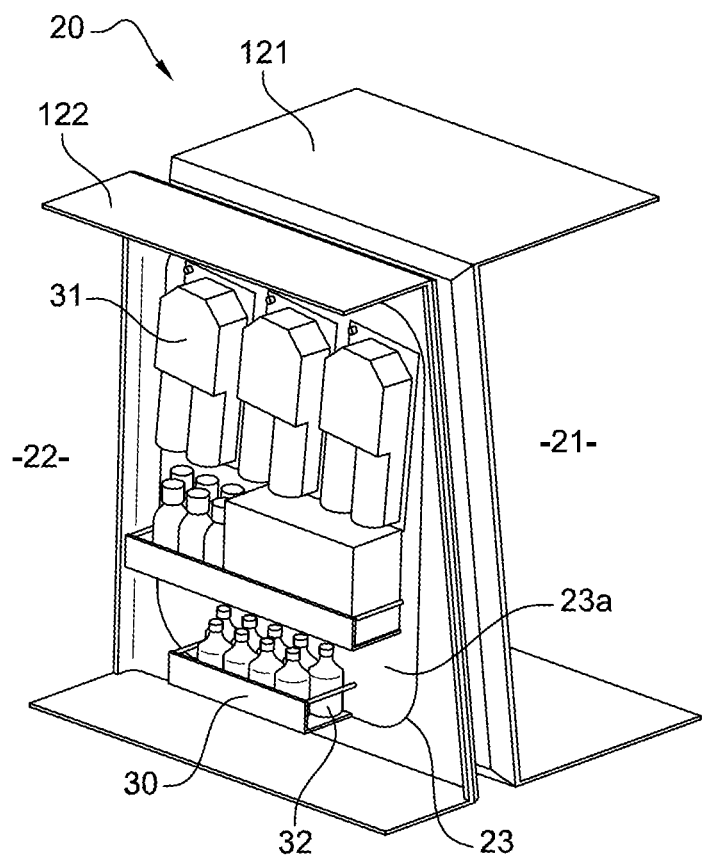
FIGS. 2a and 2b are perspective views of a first embodiment of a door according to the invention.
Figure 2B:
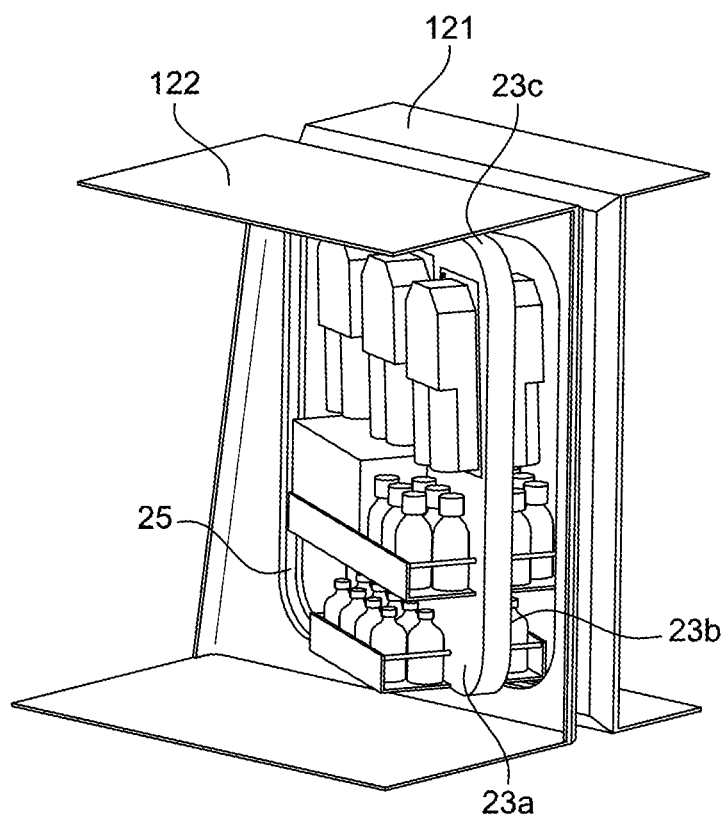
Figure 3A:
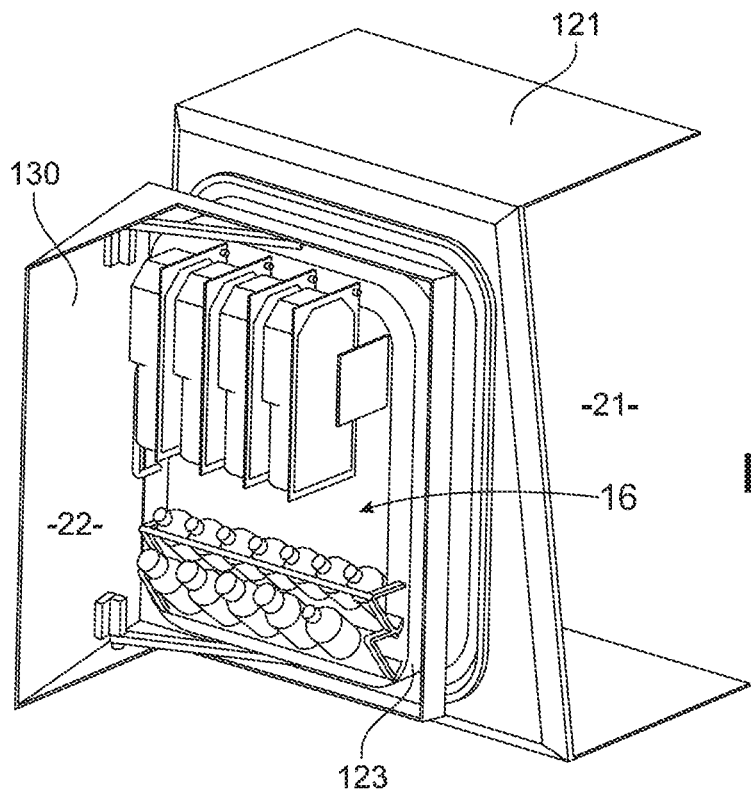
FIGS. 3a and 3b are perspective views of a second embodiment of a door according to the invention.
Figure 3B:
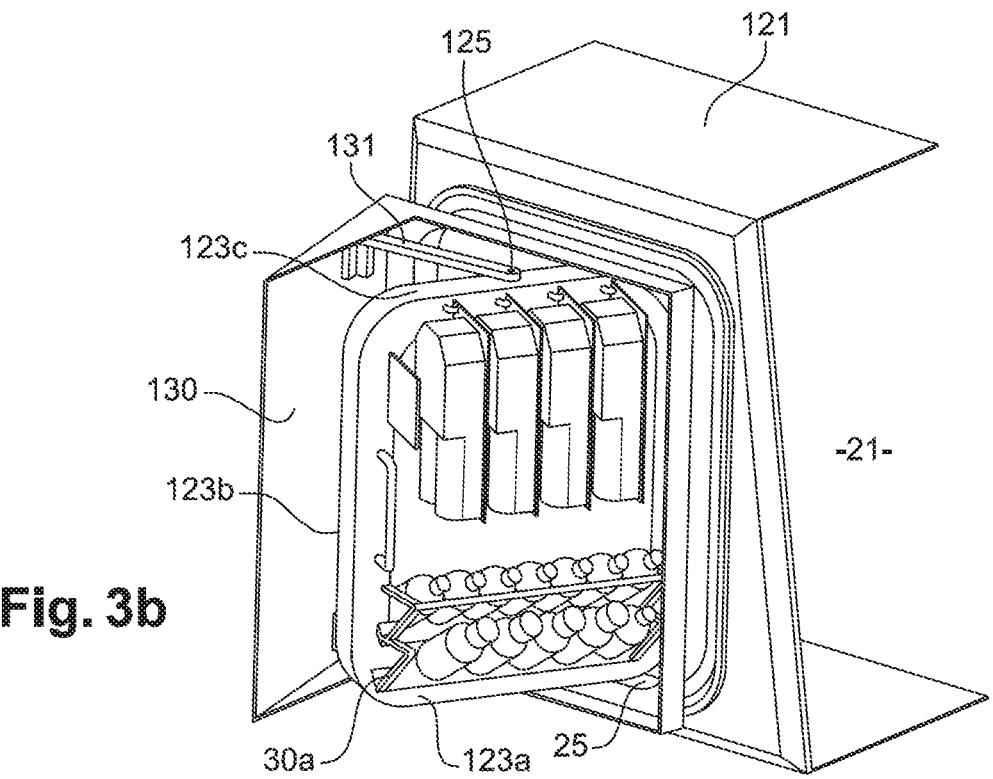

In a first embodiment illustrated in FIGS. 2a and 2b, the sealing system 16 includes a door 23 and a fixed outer frame 25.

The door 23 is pivotably movably mounted to the interface between the envelope 121 delimiting the work station 21 and the envelope 122 delimiting the airlock 22.

Figure 1:
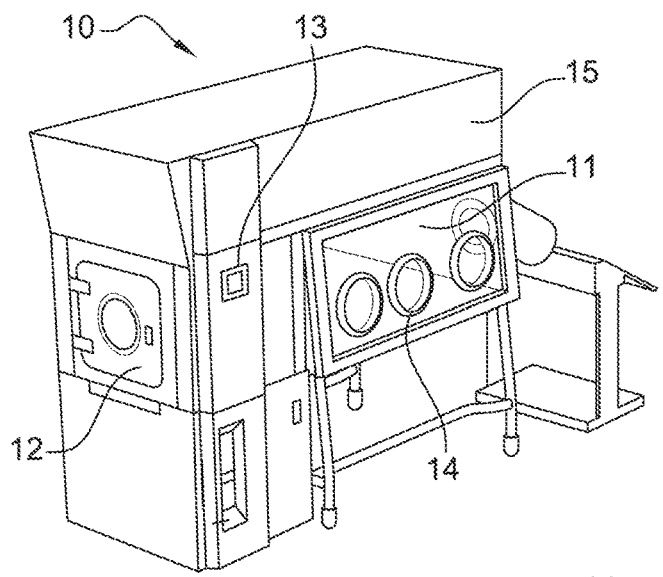
FIG. 1 is a perspective view of an existing insulator, as described in the preamble part.
Figure 5:
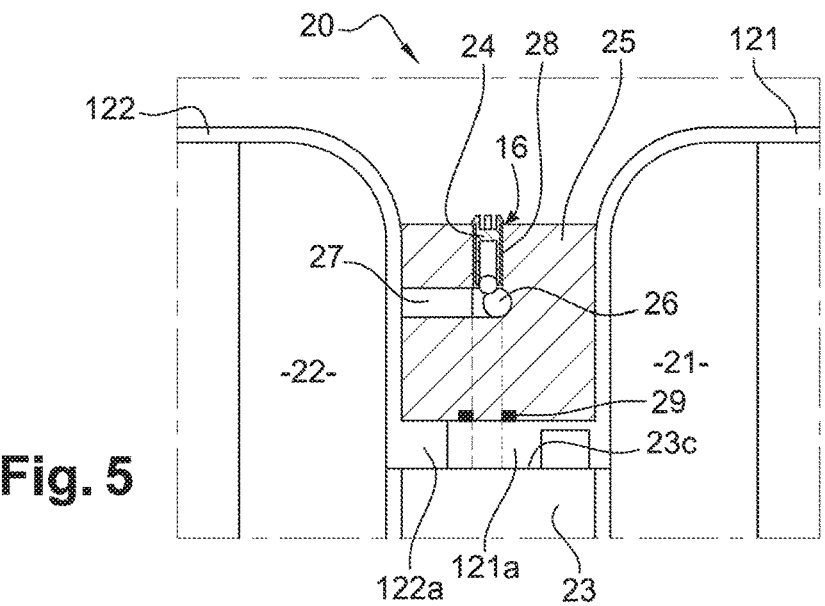
FIG. 5 is a cross-section view of an abutment formed on an axis of rotation of the first embodiment of the door.

Here, the door 23 includes a rod 24 forming a pivot axis (FIG. 5). The rod 24 is mounted integral with, vertical and in the middle of the upper edge 23c of the door 23. The rod 24 is pivotably movably housed in a corresponding housing 28 of the frame 25 and/or of either or both envelopes 121 and 122, for example here through the rim 121a of the envelope 121 (or in an alternative not being represented through a rim 122a of the envelope 122). A rod analogous to the rod 24 and forming a pivot axis can be provided on the lower edge of the door 23. Other pivot axis forming means can be provided for example an axis integral with either of the envelopes 121 and 122 and pivotably movably mounted in a housing that the door 23 includes, or even a pivotably movable axis both relative to the envelopes 121 and 122 and the door 23.

A seal 29 is here disposed about the rod 24, between the frame 25 and the rim 121a.

On each of its faces 23a and 23b (FIG. 2b), the door 23 is provided with support forming means 30, also called transfer supports, provided to receive a loading or a load including various products or materials, such as the tools 31 or the flasks 32 that have to be transferred from the work station 21 to the airlock 22 or conversely. The supports 30 can include shelves, hooks, baskets or any other member enabling products to be transferred to be maintained on one of both faces 23a/23b. The supports 30 can further include arches on which at least one removable element, such as a shelf or a basket, is hookable.

In FIG. 2a, the door 23 is in a first closed position, loaded with the products 31 and 32 on its face 23a, for example prior to the transfer from the airlock 22 to the work station 21. The face 23a is thereby located on the airlock 22 side.

In FIG. 2b, the door 23 is in an open position, intermediate between the first closed position of FIG. 2a and a second closed position not illustrated in which the face 23a is located on the work station 21 side, that is pivoted by 180° relative to the first closed position.

In the first as in the second closed position, the door 23 hermetically seals the interface between the volumes 21 and 22 against air and particles, and thus for example against germs.

The door 23 thus has a dual role:
it sealingly separates the airlock 22 from the work station 21;
it supports the products or tools to be transferred from one volume to the other (from the work station 21 to the airlock 22 and/or conversely).

The door 23 can rotate about a vertical central pivot. This rotation enables the accesses to both faces 23a and 23b of the door 23 from either of the volumes 21 and 22 to be reversed. In other words, the door 23 enables used products of the type of the loads 31 or 32 to be discharged from the operating volume 21 to the transfer volume 22, and, at the same time, new products to be conveyed from the airlock 22 to the operating volume 21.

As illustrated in FIG. 5, a fixed abutment 26 is provided to stop the door rotation at each of its closed positions. Here, the abutment 26 is a pin provided on the pivot rod 24 and transverse or perpendicular to the same. A horizontal housing 27 is provided in the frame 25. When the door 23 is pivoted between its closed positions, the abutment 26 contacts the bottom of the housing 27 or against a fixed surface not represented of the insulator 20 and/or of one of its envelopes.

Alternatively, at least one retractable abutment, non illustrated, can replace the abutment 26. Such an abutment enables the door 23 to be rotated in any direction of rotation from each of its closed positions. This retractable abutment can for example be retracted when a user applies a thrust force higher than a given threshold onto the door 23.

Each fixed 26 or retractable abutment is preferentially insulated from the operating 21 and transfer 22 volumes by the seal 29. That enables the number of parts in these volumes 21 and 22 to be limited and thus the decontamination thereof to be facilitated.

The abutment structures described above are not limiting.

In a second embodiment illustrated in FIGS. 3a, 3b and 4a to 4c, the sealing system 16 includes a door 123 and a frame 127 in which the door 123 is housed in its closed positions.

Figure 4A:
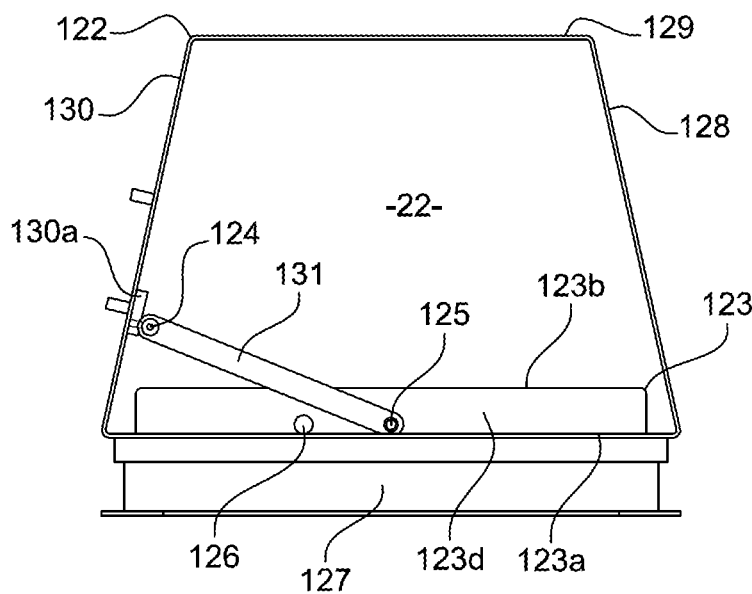
FIGS. 4a to 4c are plane bottom views of different positions reached by the door according to the second embodiment.

Unlike the door 23, the door 123 is mounted in the insulator 20 through a wall 130 and arms 131 (also called reinforcement or stands). The wall 130 can for example be part of the envelope 122 of the airlock 22 (FIG. 4a).

Each arm 131 is mounted a its two ends to a pivot 124 or 125 against respectively a support 130a integral with the wall 130 or against the upper 123c or lower 123d face of the door 123.

Figure 4B:
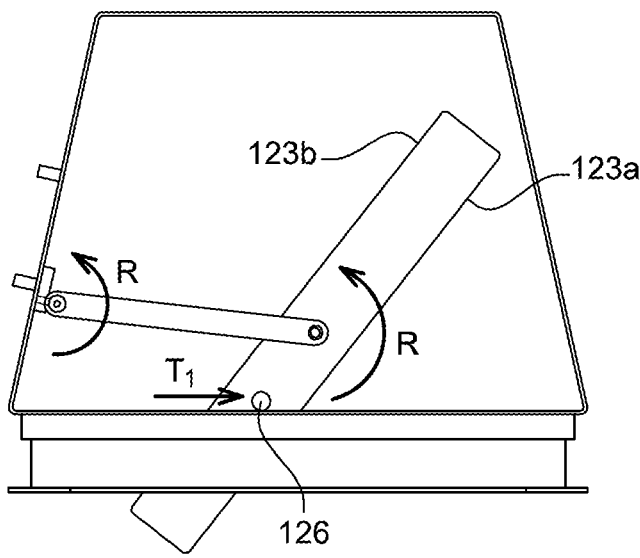
Figure 4C:
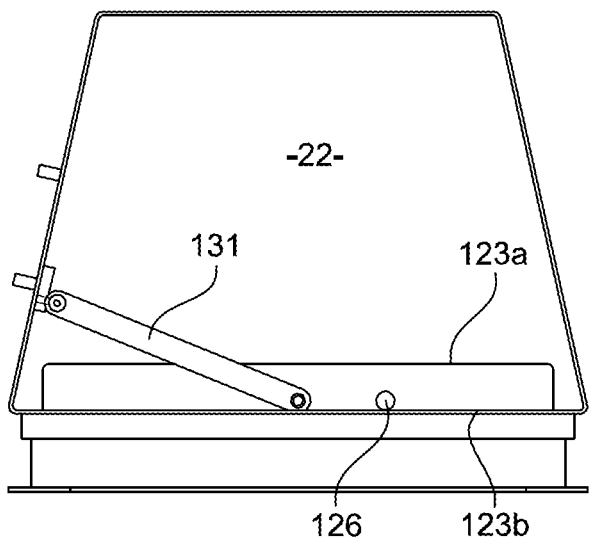

The door 123 can thus be offset in the transfer volume 22 during its transition between a first closed position (FIG. 4a) and a second closed position (FIG. 4c).

A translational guide pin 126 is disposed on either or both surfaces 123c and 123d.

A corresponding groove (not illustrated) is provided for example on or against the frame 127. The frame 127 is for example formed by the rims 121a and 122a. Thus, when the door 123 is handled to switch from one of its closed positions to the other, the pin 126 slides in the groove along an orientation T1, thus ensuring pivoting R of the arm 131 and of the door 123 along a controlled stroke (FIG. 4b).

Figure 6:
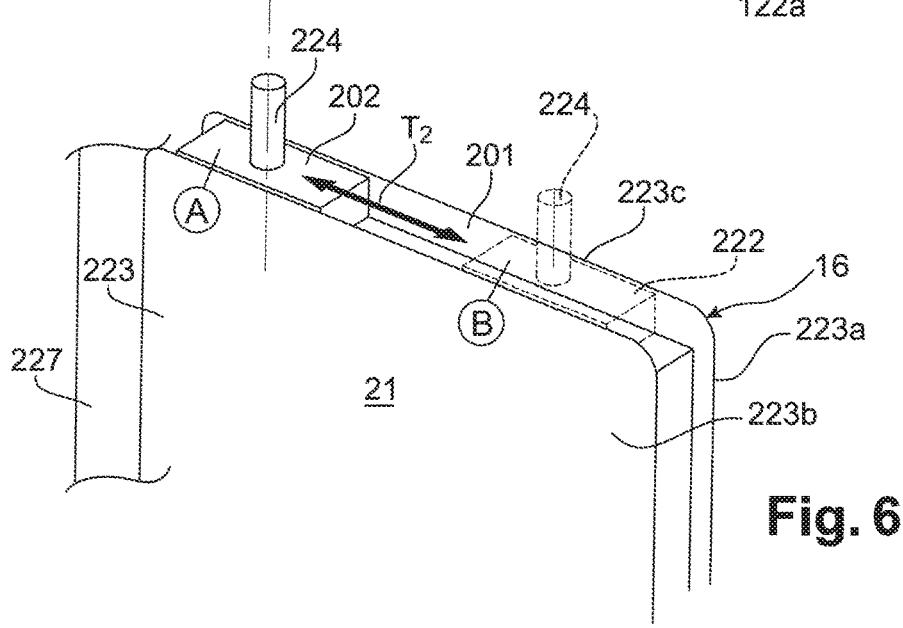
FIG. 6 is a partial view of a third embodiment of a sealing door according to the invention.

In a third embodiment represented in FIG. 6, the sealing system 16 includes a door 223 and a fixed frame 227 in which the door 223 is housed in each of its closed positions. The frame 227 can for example be part of the envelope 121 or 122 delimiting either of the volumes 21 and 22.

The door 223 is provided with a groove 201 on each of its upper 223c and lower (not represented) edges. The door 223 further includes two shuttles 202.

Each shuttle 202 is slidably mounted along a direction T2 in one of the grooves 201. For example in FIG. 6, each shuttle 202 can slide in its groove 201 between a first end position A (illustrated in continuous lines) and a second end position B (in dashed lines).

A pivot forming rod 224 is mounted integral with each shuttle 202. The rod 224 is housed in the fixed frame 227.

The door 223 can thus slide over its width relative to the frame 227 so as to have a better movement guiding of the door, which facilitates access to the transfer supports 30 from either of the volumes 21 and 22.

In this embodiment, the pivot 224 is off-centred, that is in a position different from the middle of the upper edge 223c. Alternatively, the pivot 224 can be provided centred on the upper edge 223c.

The movement of the door 223 from a first closed position, for example in which the face 223a points to the volume 22 as illustrated in FIG. 6, to a second closed position in which the face 223a points to the volume 21, for example in which the face 223a points to the volume 21, is described hereinafter.

The movement of the door 223 includes the steps of opening, pivoting relative to a frame, sliding the door 223 relative to the shuttle 224 and finally closing. The sliding and pivoting steps can be made simultaneously to simplify orientation adjustment of the door 223. Alternatively, the pivoting and sliding steps can be made distinctly, for example:
  by pivoting the door 223 at 90° from its first closed position, each shuttle 201 being for example in its first end position A relative to the door 223;
  by sliding the door 223 on its shuttles 201, for example such that each shuttle 201 is in its second end position B relative to the door 223;
  by pivoting the door 223 at 90° to the second closed position.

The supports 30 or the fixed abutment 26 or a retractable abutment as described in reference to the first embodiment are transposable to the other two embodiments.

In the embodiments described above, it is thus possible to move the door 23, 123 or 223 from a first closed position to a second closed position by pivoting, possibly accompanied with sliding, for transferring a load from at least one volume 21 or 22 to at least the other.

Each of the doors 23, 123, 223 can include a transparent zone enabling the door loading state to be viewed from the insulator containment enclosure.

The invention can find an application in pharmaceutical production or laboratory, in hospital pharmacy and/or in a laboratory.

The invention can also find an application in other fields such as the agro-food industry or nuclear industry.

What is claimed is:

1. A containment enclosure including a first compartment, a second compartment and a sealing system between the first compartment and the second compartment,
  the sealing system including a door having a first face and a second face opposite to the first face,
  the door including at least one transfer support on the first face,
  wherein the door is configured to have a first closed position and a second closed position, distinct from the first closed position, the first face respectively participating in delimiting the first compartment in the first closed position, the first face respectively participating in delimiting the second compartment in the second closed position,
  the door including a pivot rod and a seal disposed about the pivot rod, the seal being positioned between a frame and a rim, and
  the door forming a gas tight interface between the first compartment and the second compartment in the first and in the second closed position.

2. The containment enclosure according to claim 1, wherein the transfer support is located in the first compartment in the first closed position, and wherein the transfer support is located in the second compartment in the second closed position.

3. The containment enclosure according to claim 1, wherein the door includes a transfer support on each of the first face and of the second face.

4. The containment enclosure according to claim 1, wherein the door is pivotably mounted about a vertical axis passing through the middle of the lower of the door and of the upper edges of the door.

5. The containment enclosure according to claim 1, comprising at least one abutment configured to block the door in its closed positions.

6. The containment enclosure according to claim 5, wherein the abutment is insulated from each of the compartments by a seal.

7. The containment enclosure according to claim 5, wherein the abutment is fixed.

8. The containment enclosure according to claim 5, wherein the abutment is retractable.

9. The containment enclosure according to claim 1, wherein the containment enclosure is a containment enclosure for pharmaceutical production or hospital pharmacy.

10. The containment enclosure according to claim 1, wherein the transfer support contains at least one product that is moved from the first compartment to the second compartment when the door is moved from the first closed position to the second closed position.

11. A method for transferring a loading between two compartments of a containment enclosure including a first compartment, a second compartment and a sealing system between the first compartment and the second compartment,
  the sealing system including a door having a first face and a second face opposite to the first face,
  the door including at least one transfer support on the first face,
  wherein the door is configured to have a first closed position and a second closed position, distinct from the first closed position, the first face respectively participating in delimiting the first compartment in the first closed position, the first face respectively participating in delimiting the second compartment in the second closed position, the door including a pivot rod and a seal disposed about the pivot rod, the seal being positioned between a frame and a rim, and the door forming a gas tight interface between the first compartment and the second compartment in the first and in the second closed position, the method including the step of moving the door from the first closed position to the second closed position.

12. The method according to claim 11, including a step of loading at least one load onto or into said transfer support prior to the step of moving the door, the movement of the door bringing the product from one of the compartments to the other of the compartments.

13. The method according to claim 11, wherein the containment enclosure is a containment enclosure for pharmaceutical production or hospital pharmacy.

* * * * *